US011206234B2

(12) United States Patent
Murillo et al.

(10) Patent No.: US 11,206,234 B2
(45) Date of Patent: Dec. 21, 2021

(54) VALIDATING PROPOSED MESSAGE RECIPIENTS BASED ON NUMBER OF MESSAGE KEYWORDS

(71) Applicant: International Business Machines Corporation, Armonk, NY (US)

(72) Inventors: Jessica Murillo, Round Rock, TX (US); Johnny Shieh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 45 days.

(21) Appl. No.: 16/740,557

(22) Filed: Jan. 13, 2020

(65) Prior Publication Data

US 2021/0218698 A1 Jul. 15, 2021

(51) Int. Cl.
*G06F 15/16* (2006.01)
*H04L 12/58* (2006.01)

(52) U.S. Cl.
CPC .............. *H04L 51/28* (2013.01); *H04L 51/14* (2013.01)

(58) Field of Classification Search
CPC ......... H04L 51/28; H04L 51/14; H04L 51/12; H04L 51/30; G06Q 10/107
USPC ................................................ 709/206, 245
See application file for complete search history.

(56) References Cited

U.S. PATENT DOCUMENTS

| | | | |
|---|---|---|---|
| 8,103,726 B2 | 1/2012 | Stoddard et al. | |
| 8,819,152 B2 | 8/2014 | Downing | |
| 10,270,720 B2 | 4/2019 | Wang et al. | |
| 2008/0114846 A1* | 5/2008 | Sano | H04L 51/28 709/206 |
| 2008/0250114 A1* | 10/2008 | Dubovsky | G06Q 10/107 709/206 |
| 2009/0157650 A1* | 6/2009 | Chow | G06F 16/972 |
| 2011/0055334 A1* | 3/2011 | Tivyan | H04L 51/30 709/206 |
| 2015/0312197 A1* | 10/2015 | Dong | H04L 51/02 715/752 |
| 2016/0308814 A1* | 10/2016 | Meister | H04L 51/14 |
| 2016/0366088 A1* | 12/2016 | Mahmoud | H04L 67/306 |
| 2017/0142059 A1* | 5/2017 | Shuster | H04L 51/04 |
| 2017/0277770 A1 | 9/2017 | Singh et al. | |
| 2018/0026930 A1* | 1/2018 | Rankin | H04L 51/22 709/206 |
| 2018/0075414 A1* | 3/2018 | Saito | H04L 51/28 |
| 2018/0131805 A1* | 5/2018 | Byrne | H04M 1/72436 |
| 2018/0219827 A1 | 8/2018 | Agathangelos | |

OTHER PUBLICATIONS

"A guide to JavaScript Regular Expressions", Flavio Copes, Last Updated Oct. 18, 2019, 30 pages, <https://flaviocopes.com/javascript-regular-expressions/>.

(Continued)

*Primary Examiner* — Johnny B Aguiar
(74) *Attorney, Agent, or Firm* — Donald G. Weiss (57) ABSTRACT

In an approach to validating proposed recipients based on message contents, a number of keywords in a message under construction that are not in a keyword database for each addressee in the message under construction are counted. Responsive to determining that the number of keywords that are not in the keyword database for each addressee in the message under construction is above a threshold, notifying the user of a possible incorrect addressee.

14 Claims, 5 Drawing Sheets

(56) References Cited

OTHER PUBLICATIONS

"Can Outlook automatically toward Email based on body content?", Metafilter, posted by de void to Computers & Internet, Dec. 2, 2005 10:01 AM, 5 pages, <https://ask.metafilter.com/28314/Can-Outlook-automatically-foward-Email-based-on-body-content>.

"Create a customer list", Google Ads Help, Accessed Nov. 6, 2019, 11:25 AM, 3 pages, <https://support.google.com/google-ads/answer/6276125?hl=en&ref_topic=6296507>.

"Email Address Validation Tool", TextMagic, Accessed Nov. 6, 2019, 10:37 AM, 5 pages, <https://www.textmagic.com/free-tools/email-validation-tool>.

"Email Address Verifier", Verify Email Address tool, Accessed Nov. 6, 2019, 10:41 AM, © 2019 Email Hippo, 3 pages, <https://tools.verifyemailaddress.io/>.

"Email Checker", Email Checker, Accessed Nov. 6, 2019, 10:30 AM, © 2017 email-checker.net, 1 page, <https://email-checker.net/>.

"Email Validation", Validate Email Addresses, Accessed Nov. 6, 2019, 10:44 AM, 1 page, <https://validateemailaddress.org/>.

"Free email address validator", Verifalia, Accessed Nov. 6, 2019, 10:15 AM, 6 pages, <https://verifalia.com/validate-email>.

"Help with email address confirmation", Twitter, Accessed on Nov. 6, 2019, 11:03 AM, 3 pages, <https://help.twitter.com/en/managing-your-account/cant-confirm-my-email-address>.

"How to Find or Validate an Email Address", Regular Expressions, Last updated Oct. 21, 2019, 4 pages, <https://www.regular-expressions.info/email.html>.

"Match My Email User Guide", Match My Email, © RAE Internet Inc., 2019, 18 pages, <https://www.matchmyemail.com/setup-guides/user-guide-match-my-email-multimatch.pdf>.

"Outlook Rules That Rule—Forward mails based on keywords", Technet, Microsoft, Suzanne100, Jan. 19, 2010, 4 pages, <https://blogs.technet.microsoft.com/hub/2010/01/19/outlook-rules-that-rule-forward-mails-based-on-keywords/>.

"Outlook: Automatically Forward Emails Based On Subject", Extend Office, Accessed on Aug. 8, 2019, 8:16 AM, 12 pages, <https://www.extendoffice.com/documents/outlook/1484-outlook-auto-forward-by-subject.html>.

"Phrase for (confirm it before you send email or latter) [closed]", English.Stack Exchange, Asked Oct. 7, 2013 by AbdulAziz, 5 pages, <https://english.stackexchange.com/questions/130349/phrase-for-confirm-it-before-you-send-email-or-letter>.

"Send emails based on Gmail contents", Zapier, Accessed on Nov. 6, 2019, 11:46 AM, 3 pages, <https://zapier.com/app-directory/gmail/integrations/gmail/2622/send-emails-based-on-gmail-contents>.

"Sending Email Address & Verification", Survey Monkey, Help Center, Accessed Nov. 6, 2019, 11:05 AM, 4 pages, <https://help.surveymonkey.com/articles/en_US/kb/Sender-Email-Address>.

"Verify an Email Address", Constant Contact, Artcile 000005497, updated Sep. 25, 2019, 9 pages, <https://knowledgebase.constantcontact.com/articles/KnowledgeBase/5497-verify-the-account-email-address?lang=en_US>.

Ferreira, R. G., "How to forward messages based on their content in Horde webmail", plesk, Accessed Nov. 6, 2019, 11:49 AM, 5 pages, <https://support.plesk.com/hc/en-us/articles/115003241313-How-to-forward-messages-basing-on-their-content-in-Horde-webmail>.

Tschabitscher, H., "How to Forward Gmail Email Using Filters", Lifewire, Updated Jul. 30, 2019, 7 pages, <https://www.lifewire.com/how-to-forward-gmail-email-using-filters-1171934>.

* cited by examiner

To: John Doe/City/Country

Subject: Project RED

Dear John,

─302

We're starting project RED with our ISV partners and we need to know if you can join up with them at the beginning of March?

This will require a port of their Java app onto Linux and we are hoping to have it done by Oct.

Let me know if you have any questions.

FIG. 3a

To: John Doe1/US/Company

Subject: What's going on with Blue?

Hey John,

Looks like Blue is going to slip because the resources we need are going to debug on X issues. The firmware will have to wait until those engineers get back.

In the meantime, let's work on System design and then when the problems with X are resolved we can merge Blue and System into the same release.

Problems? Issues?

FIG. 3b

- John Doe/City/Company
- (doej@us.company.com)
  - RED
  - ISV
  - March/Mar
  - Java
  - Linux
  - Oct/October

FIG. 4a

- John Doe1/US/Company
- (John.Doe1@company.com)
  - Blue
  - X
  - Firmware
  - System

FIG. 4b

502 —⟶ Did you mean: John Doe1/US/ Company?

To: User1/CityA/Company, User2/ CityB /Company, John Doe/City/Company, User3/ CityA /Company, User4/US/ Company, User5/ CityC/ Company,  ⟵504

Subject: Blue slipping again
⟵506
Hi All,

I wanted to let you know that the X team has come back to us and told us that the firmware on that model is going to have to undergo more testing. We had already split some of our engineers between System and the X issue and now we're going to have to put all of them on X. Because of that System is going to slip into 4$^{th}$ Quarter.

602 — | John F. Doe/US/Company (John Doe, John.F.Doe@company.com) |
John M. Doe/US/Company (John Doe, jdoe@company.com)
John Doe/City/Company (doej@us.company.com)
John Doe/UK/Company (JOHNDOE@UK.company.com)
John Doe1/US/Company (John.Doe1@company.com)
John W. Doe/City/Company (John Doe, johndoe@us.company.com)
John W. Doe/City/Country (John Doe, doejohn@country.company.com)

VALIDATING PROPOSED MESSAGE RECIPIENTS BASED ON NUMBER OF MESSAGE KEYWORDS

BACKGROUND

The present invention relates generally to the field of transmission of digital information, and more particularly to validating proposed recipients based on message contents.

An email address is a unique identifier for an email account. It is used to both send and receive email messages over the Internet. Similar to physical mail, an email message requires an address for both the sender and recipient in order to be sent successfully. Every email address has two main parts: a username and domain name. The username comes first, followed by an at (@) symbol, followed by the domain name.

Autofill and autocomplete are similar features in which an application predicts the rest of a word, or name, that a user is typing. Autofill speeds up human-computer interactions when it correctly predicts the word a user intends to enter after only a few characters have been typed into a text input field. It works best in domains when some words are much more common, such as when addressing an e-mail.

SUMMARY

Embodiments of the present invention disclose a method, a computer program product, and a system for validating proposed recipients based on message contents. In one embodiment, a number of keywords in a message under construction that are not in a keyword database for each addressee in the message under construction are counted. Responsive to determining that the number of keywords that are not in the keyword database for each addressee in the message under construction is above a threshold, notifying the user of a possible incorrect addressee.

DETAILED DESCRIPTION

In large organizations, many people often have similar or identical names. Typically they pick email addresses or social media handles that are as close to their actual names as possible. As a result, there are minor differences between the email addresses of many users with the same or similar names. Some email programs base their autofill of the email address on the actual name of the user. Many email and electronic addressing systems base their autofill on cached names used in the past. With autofill and caching, there is a significant risk that the wrong user will be selected by the user when they are addressing a potential target.

Because of this autofill may be problematic, leading to not just potentially embarrassing miscommunications, but to the possibility of sensitive information being dispatched to the wrong people. Confidential information may be sent to the wrong recipients; company trade secrets may be divulged to competitors; personal information on an employee may be sent to the wrong recipient by human resources; the potential for harm is almost limitless. This is a problem that occurs frequently today.

The present invention is a method, computer program product, and system for validating the proposed recipients based on the content of the message under construction as compared to historical data associated with each recipient. In an embodiment, the message under construction may use an email client program. In another embodiment, the message under construction may use a web-based email client, for example, a client running in a web browser. In yet another embodiment, the message under construction may use any system that is capable of using autofill to complete the name and/or address field for the message under construction.

Figure 1:
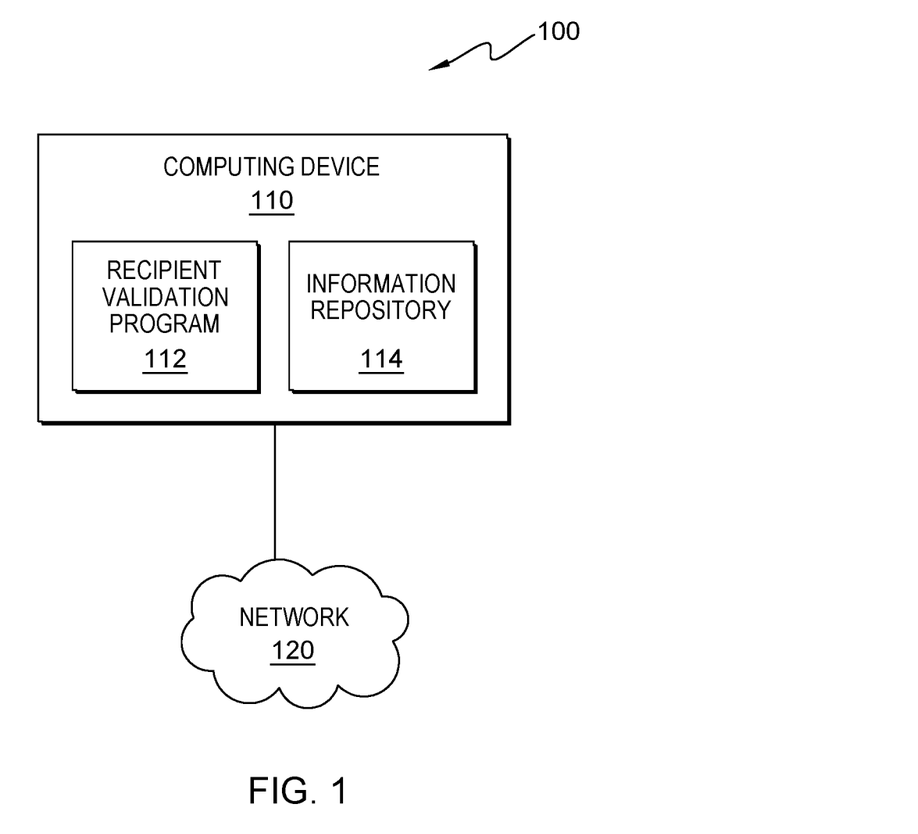
FIG. 1 is a functional block diagram illustrating a distributed data processing environment, in accordance with an embodiment of the present invention.

FIG. 1 is a functional block diagram illustrating a distributed data processing environment, generally designated 100, suitable for operation of recipient validation program 112 in accordance with at least one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes computing device 110 connected to network 120. Network 120 can be, for example, a telecommunications network, a local area network (LAN), a wide area network (WAN), such as the Internet, or a combination of the three, and can include wired, wireless, or fiber optic connections. Network 120 can include one or more wired and/or wireless networks that are capable of receiving and transmitting data, voice, and/or video signals, including multimedia signals that include voice, data, and video information. In general, network 120 can be any combination of connections and protocols that will support communications between computing device 110 and other computing devices (not shown) within distributed data processing environment 100.

Computing device 110 can be a standalone computing device, a management server, a web server, a mobile computing device, or any other electronic device or computing system capable of receiving, sending, and processing data. In an embodiment, computing device 110 can be a laptop computer, a tablet computer, a netbook computer, a personal computer (PC), a desktop computer, a personal digital assistant (PDA), a smart phone, or any programmable electronic device capable of communicating with other computing devices (not shown) within distributed data processing environment 100 via network 120. In another embodiment, computing device 110 can represent a server computing system utilizing multiple computers as a server system, such as in a cloud computing environment. In yet another embodiment, computing device 110 represents a computing system utilizing clustered computers and components (e.g., database server computers, application server computers, etc.) that act as a single pool of seamless resources when accessed within distributed data processing environment 100.

In an embodiment, computing device 110 includes recipient validation program 112. In an embodiment, recipient validation program 112 is a program, application, or subprogram of a larger program for validating proposed recipients based on contents of the message under construction. In an alternative embodiment, recipient validation program 112 may be located on any other device accessible by computing device 110 via network 120.

In an embodiment, computing device 110 includes information repository 114. In an embodiment, information repository 114 may be managed by recipient validation program 112. In an alternate embodiment, information repository 114 may be managed by the operating system of the device, alone, or together with, recipient validation program 112. Information repository 114 is a data repository that can store, gather, compare, and/or combine information. In some embodiments, information repository 114 is located externally to computing device 110 and accessed through a communication network, such as network 120. In some embodiments, information repository 114 is stored on computing device 110. In some embodiments, information repository 114 may reside on another computing device (not shown), provided that information repository 114 is accessible by computing device 110. Information repository 114 includes, but is not limited to, user data, address book data, keyword database data, web browser cache and data, and other data that is received by recipient validation program 112 from one or more sources, and data that is created by recipient validation program 112.

Information repository 114 may be implemented using any volatile or non-volatile storage media for storing information, as known in the art. For example, information repository 114 may be implemented with a tape library, optical library, one or more independent hard disk drives, multiple hard disk drives in a redundant array of independent disks (RAID), solid-state drives (SSD), or random-access memory (RAM). Similarly, information repository 114 may be implemented with any suitable storage architecture known in the art, such as a relational database, an object-oriented database, or one or more tables.

Information repository 114 includes a database to store keywords for prior addressees of the message system. In an embodiment recipient validation program 112 creates a database, if it does not already exist, for each user of the message system to store keywords for each addressee to whom the user addresses a message. In an embodiment, recipient validation program 112 creates an individual database for each user of the messaging system. In another embodiment, recipient validation program 112 creates a master database for the messaging system, with entries for each individual user. In an embodiment, the keyword database holds a fixed number of keywords for each addressee. In an embodiment, the keywords have a field that contains the last date and time the keyword was accessed, whether the keyword was added to the database, or when the keyword was accessed as the result of a database search when a new message was created. The date field is used, for example, to allow a least recently used algorithm to determine which keyword or keywords should be replaced if new keywords are found for that particular addressee during the creation of a new message, as described below. In this way, the database is kept current, by flushing old keywords when, for example, an addressee changes job function, project, or location, or leaves the organization. In an embodiment, once the database has been created, recipient validation program 112 will add new keywords to the database as described below.

Figure 3A:
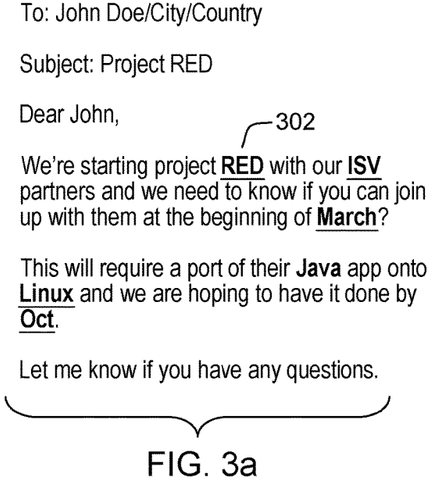
FIGS. 3a and 3b are examples of two messages addressed to recipients with similar names, in accordance with an embodiment of the present invention.
Figure 3B:
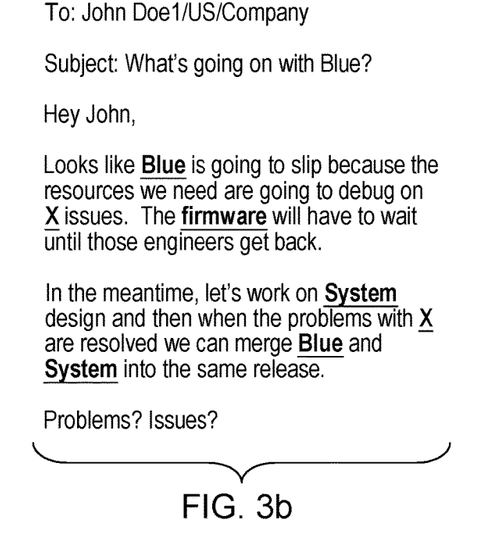
Figure 4A:
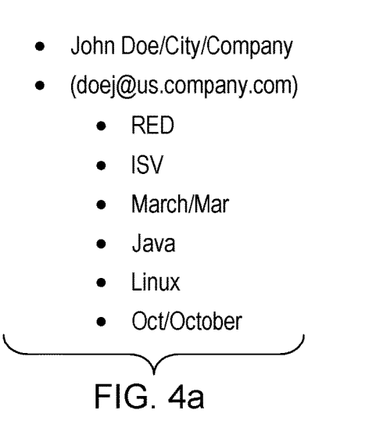
FIGS. 4a and 4b are examples of the keyword databases for the two recipients in FIGS. 3a and 3b, in accordance with an embodiment of the present invention.
Figure 4B:
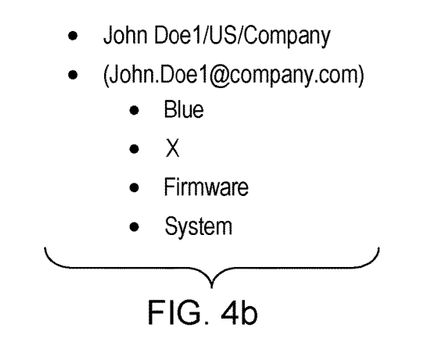

FIGS. 4a and 4b are examples of the keyword database for two different, but similar, addressees to whom the user has previously addressed messages, as shown in FIGS. 3a and 3b. In an embodiment, recipient validation program 112 added the entries shown in FIGS. 4a and 4b, for example, to the keyword database for the prior addressees John Doe/City/Company and John Doe1/US/Company, respectively, when recipient validation program 112 found these keywords while scanning the prior messages shown in FIGS. 3a and 3b, respectively.

Figure 2:
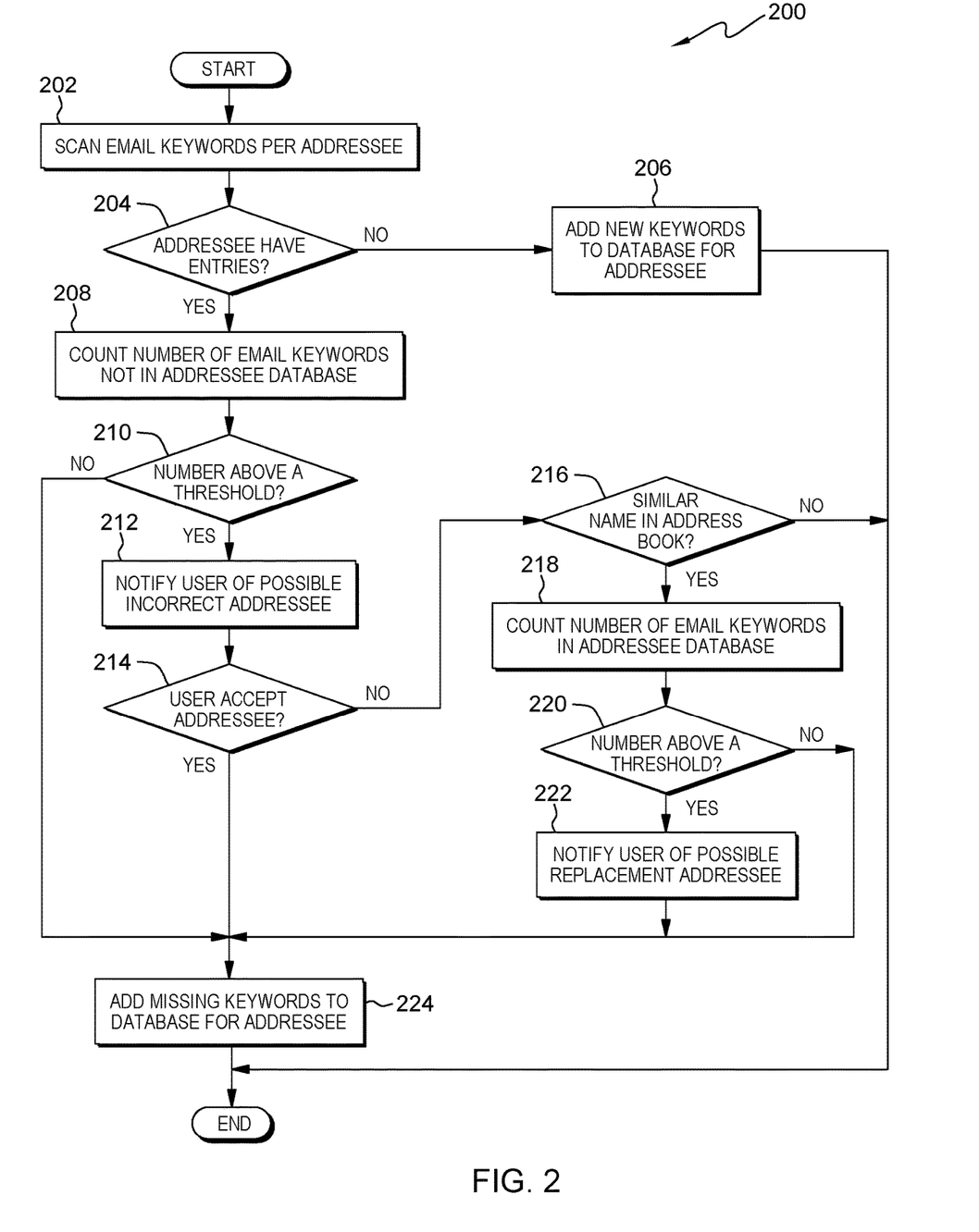
FIG. 2 is a flowchart depicting operational steps of the recipient validation program, on a computing device within the distributed data processing environment of FIG. 1, for validating the proposed recipients based on the contents of a message, in accordance with an embodiment of the present invention.

FIG. 2 is a flow chart diagram of workflow 200 depicting operational steps for recipient validation program 112 for validating proposed recipients based on the contents of a message under construction in accordance with at least one embodiment of the invention. In an alternative embodiment, the steps of workflow 200 may be performed by any other program while working with recipient validation program 112. In an embodiment, recipient validation program 112 scans a new message for message keywords per addressee. In an embodiment, recipient validation program 112 determines whether the addressee has entries in the addressee database. In an embodiment, recipient validation program 112 counts the number of keywords in the message not found in the addressee database. In an embodiment, recipient validation program 112 determines whether the number of keywords in the message not found in the addressee database is above a threshold. In an embodiment, recipient validation program 112 notifies the user of a possible incorrect addressee. In an embodiment, recipient validation program 112 determines if the user has accepted the original addressee. In an embodiment, recipient validation program 112 determines whether there are similar names in the address book or address cache for the user. In an embodiment, recipient validation program 112 counts the number of keywords in the message that are in the keyword database for the addressee. In an embodiment, recipient validation program 112 determines whether the number of keywords in the message that are in the keyword database for the addressee is above a threshold. In an embodiment, recipient validation program 112 notifies the user of a potential replacement addressee. In an embodiment, recipient validation program 112 adds keywords to the database for the addressee.

It should be appreciated that embodiments of the present invention provide at least for validating proposed recipients based on the contents of the message under construction. However, FIG. 2 provides only an illustration of one implementation and does not imply any limitations with regard to the environments in which different embodiments may be implemented. Many modifications to the depicted environment may be made by those skilled in the art without departing from the scope of the invention as recited by the claims.

Recipient validation program 112 scans email keywords per addressee (step 202). In an embodiment, recipient validation program 112 scans the message under construction by the user to identify the addressees and any keywords that may be associated with the addressees. In an embodiment, recipient validation program 112 checks the keyword database for keywords associated with each addressee of the message under construction. FIGS. 3*a* and 3*b* are examples of two messages created by the user that are addressed to addressees with similar names and/or email addresses. In the embodiment in FIGS. 3*a* and 3*b*, the keywords identified by recipient validation program 112 are presented in bold text with underlining (for example, designator 302 in FIG. 3*a*). In another embodiment, the keywords identified by recipient validation program 112 may be presented using any method known to those skilled in the art to highlight the keywords. In yet another embodiment, the keywords identified by recipient validation program 112 may not be highlighted, but just selected by recipient validation program 112 to use to search the keyword database, or to be added to the keyword database if not already there.

Recipient validation program 112 determines if the addressee have entries (step 204). In an embodiment, recipient validation program 112 checks the keyword database to determine if the keyword database has entries for an addressee. If recipient validation program 112 determines that the keyword database does not have entries for the addressee, then recipient validation program 112 proceeds to step 206. If recipient validation program 112 determines that the keyword database does have entries for the addressee, then recipient validation program 112 proceeds to step 208.

Recipient validation program 112 add keywords to database for addressee (step 206). In an embodiment, if any addressee in the message under construction does not already have entries in the keyword database, recipient validation program 112 adds the entries found in step 202 to the keyword database for each addressee in the message under construction that does not already have entries in the keyword database.

Recipient validation program 112 counts the number of email keywords not in the addressee database (step 208). At step 208, recipient validation program 112 compares the keywords found in the message under construction with the keyword database for that particular addressee. In an embodiment, recipient validation program 112 counts the number of keywords for that particular addressee that are not found in the keyword database.

Recipient validation program 112 determines whether the number is above a threshold (step 210). At step 210, recipient validation program 112 determines whether the number of keywords in the message under construction for the particular addressee that are not found in the keyword database exceeds a threshold. In an embodiment, the threshold may be a system default. In another embodiment, the user may set the threshold. In yet another embodiment, the threshold may be set by any other valid means that a person with skill in the art would recognize. If the number of keywords in the message for the particular addressee that are not found in the keyword database exceeds the threshold, then recipient validation program 112 continues to step 212.

If recipient validation program 112 determines that the number of keywords in the message under construction for the particular addressee that are not found in the keyword database does not exceed the threshold, then recipient validation program 112 continues to step 224.

Figure 5:
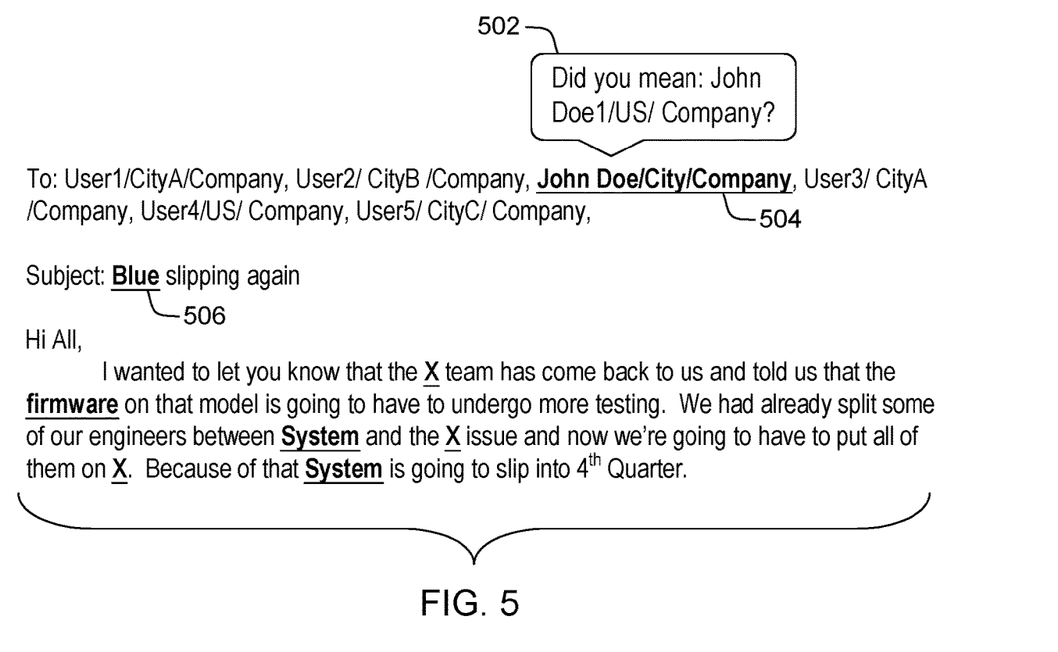
FIG. 5 is an example of a message possibly addressed to an incorrect addressee, with a suggestion for a possible correct addressee, in accordance with an embodiment of the present invention.

Recipient validation program 112 notifies user of a possible incorrect addressee (step 212). At step 212, recipient validation program 112 notifies the user of a possible incorrect addressee for a particular intended recipient. In an embodiment, if recipient validation program 112 determined in step 210 that the number of keywords in the message under construction for the particular addressee that are not found in the keyword database exceeds the threshold, then recipient validation program 112 notifies the user that the particular addressee may be the incorrect addressee. In an embodiment, recipient validation program 112 notifies the user of a possible incorrect addressee by opening a pop-up window in the email client program. For example, FIG. 5 illustrates a pop-up window opened in an email client program notifying the user of a possible incorrect addressee.

Recipient validation program 112 determines whether the user has accepted the addressee (step 214). At step 216, recipient validation program 112 determines whether the user has accepted the addressee as originally entered. In an embodiment, recipient validation program 112 receives an input from the user indicating whether the addressee as originally entered is the actual addressee that the user intended to receive the message under construction. In an embodiment, if recipient validation program 112 determines that the user has accepted the addressee as originally entered, then recipient validation program 112 continues to step 224. If recipient validation program 112 determines that the user has not accepted the addressee as originally entered, then recipient validation program 112 continues to step 216.

Recipient validation program 112 determines whether similar name are in address book (step 216). At step 216, recipient validation program 112 searches the address book or address cache of the user to determine if names in the address book or address cache are similar to the name of the addressee in the message under construction. In an embodiment, recipient validation program 112 uses natural language processing to determine whether similar names are in the address book or address cache of the user. In another embodiment, recipient validation program 112 uses an algorithm, for example, the common key method, the edit distance method, the list method, or the statistical similarity method, to determine whether similar names are in the address book or address cache. In yet another embodiment, recipient validation program 112 may use any algorithm as would be known to a person of skill in the art to determine whether similar names are in the address book or address cache of the user. If recipient validation program 112 does not find any names in the address book or address cache that are similar to the name of the addressee in the message under construction, then recipient validation program 112 ends for the message under construction.

Recipient validation program 112 counts number of email keywords in addressee database (step 218). At step 218, if recipient validation program 112 finds a similar name or names in the address book or address cache for the user in step 216, then recipient validation program 112 searches the keyword database to determine if the similar name has entries in the database. If recipient validation program 112 determines that the keyword database contains entries for the similar name or names, then recipient validation program 112 counts the number of keywords in the message that are in the keyword database for each similar name in the address book or address cache of the user. If recipient validation program 112 determines that the keyword database does not contain entries for the similar name or names, then recipient validation program 112 ends for the message under construction.

Recipient validation program 112 determines whether number above a threshold (step 220). In an embodiment, recipient validation program 112 determines if the number of keywords in the message under construction that are in the keyword database for a similar name in the address book or address cache exceeds a threshold. In an embodiment, the threshold may be a system default. In another embodiment, the user may set the threshold. In yet another embodiment, the threshold may be set by any other means as would be known to a person of skill in the art. If recipient validation program 112 determines that the number of keywords in the message under construction that are in the keyword database for the similar name in the address book or address cache exceeds the threshold, then recipient validation program 112 continues to step 222 for that similar name.

Recipient validation program 112 repeats step 220 for each similar name found in the address book or address cache of the user.

If recipient validation program 112 determines that none of the similar names in the address book or address cache have a number of keywords that exceeds the threshold, then recipient validation program 112 ends for the message under construction.

Recipient validation program 112 notifies user of potential replacement addressee (step 222). At step 222, recipient validation program 112 notifies the user of potential replacement addressee(s) from the address book or address cache for the incorrect addressee. In an embodiment, recipient validation program 112 will notify the user of a potential replacement addressee from the address book or address cache as shown in FIG. 5. In FIG. 5, addressee 504 has been identified by recipient validation program 112 as a possible incorrect addressee. As a result, recipient validation program 112 checked the keyword database, and found several keywords that are in the message under construction, as denoted in this example in bold, underlined text, as illustrated by the word "Blue" denoted as designator 506. Other matching keywords in the example of FIG. 5 are not specifically called out, but are highlighted in bold text with underlining. In an embodiment, recipient validation program 112 creates pop-up balloon 502 with the suggested recipient based on the analysis of steps 216 through 220.

Figure 6:
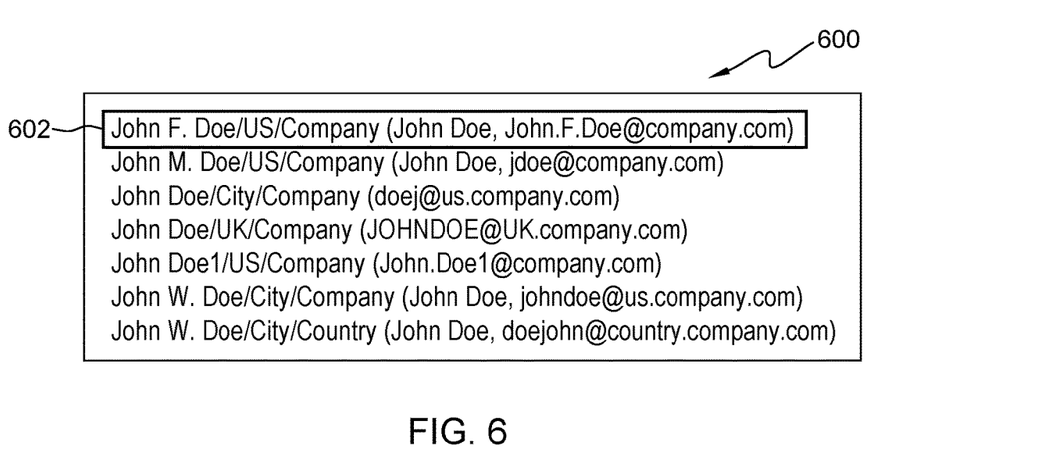
FIG. 6 is an example of a list of possible recipients for a message, in accordance with an embodiment of the present invention.

In another embodiment, recipient validation program 112 notifies the user of potential replacement addressee(s) from the address book or address cache of the user by displaying a list of possible correct addressees, as illustrated in FIG. 6. In FIG. 6, recipient validation program 112 displays pop-up menu 600, which contains a list of all the possible correct recipients as determined in steps 216 through 220, and highlights possible recipient 602 as the most likely correct addressee based on the analysis in steps 216 through 220. For example, recipient validation program 112 highlights possible correct recipient 602 because this possible recipient had the highest number of keywords from the message under construction in the keyword database.

Recipient validation program 112 adds missing keywords to the keyword database for the addressee (step 224). At step 224, recipient validation program 112 adds any keywords found in the message under construction to the keyword database for all the addressees in the message under construction. In an embodiment, the number of entries in the keyword database for each addressee is fixed. In an embodiment, if the keyword database for the addressee is already full, then recipient validation program 112 will replace entries in the keyword database for the addressee with the new keywords from the message under construction. In an embodiment, recipient validation program 112 uses the least recently used algorithm to decide which entries in the keyword database to replace. In another embodiment, recipient validation program 112 uses any replacement algorithm as known to those skilled in the art.

In another embodiment, if the user has accepted the addressee in step 214 as originally entered, then the keyword database may not have enough entries to properly distinguish that particular addressee from addressees with the same or similar names. Therefore, recipient validation program 112 expands the number of keywords for that addressee to gather additional information for future corrections for that particular addressee, to reduce the likelihood of incorrectly applying autofill for that particular addressee.

The examples of FIGS. 5 and 6 are only two illustrations of possible methods that may be used to notify the user of possible correct addressees. There are many other ways that recipient validation program 112 can notify the user of possible correct recipients as a person with skill in the art would recognize.

Figure 7:
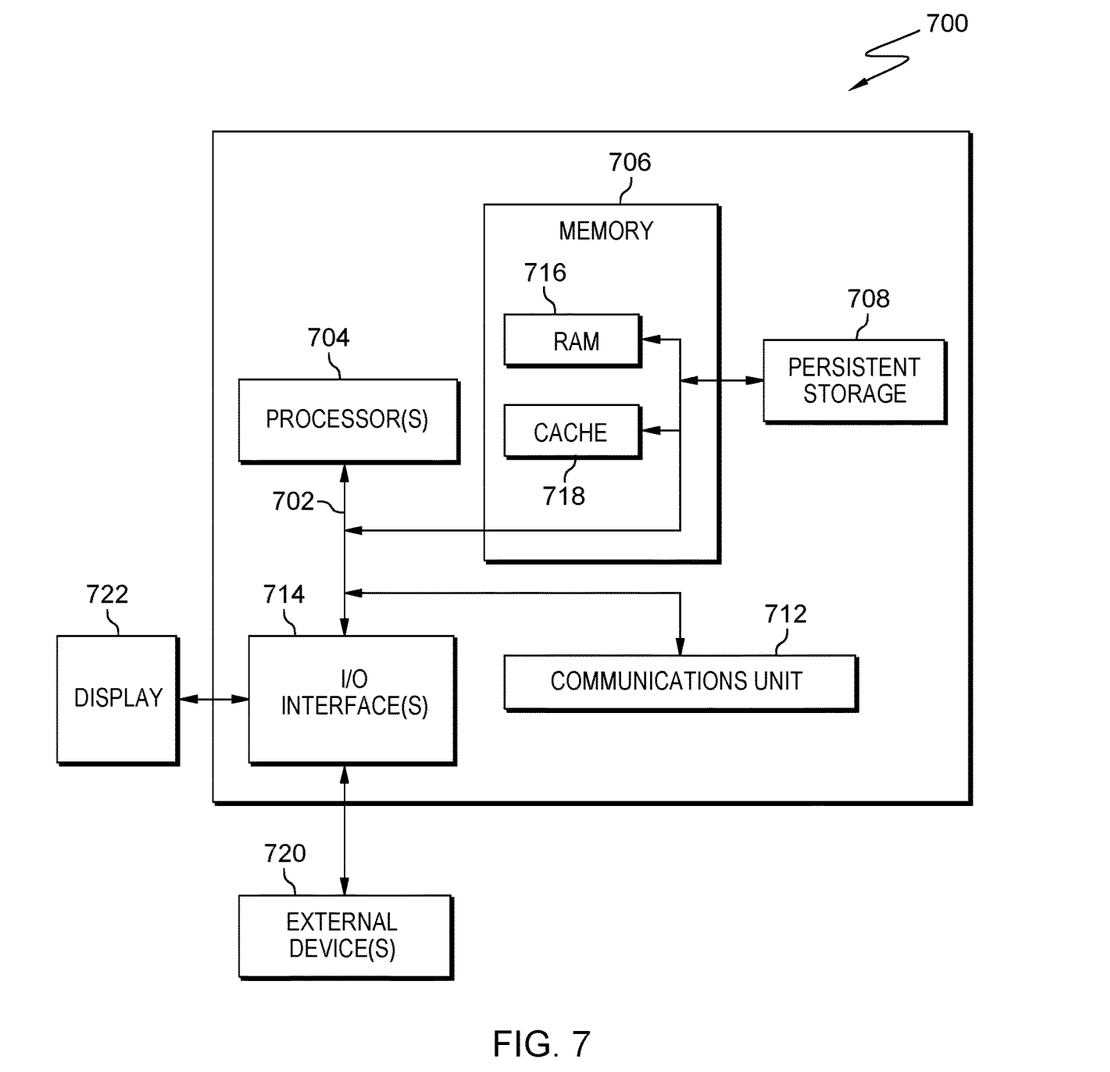
FIG. 7 depicts a block diagram of components of the computing devices executing the recipient validation program within the distributed data processing environment of FIG. 1, in accordance with an embodiment of the present invention.

FIG. 7 is a block diagram depicting components of computing device 110 suitable for recipient validation program 112, in accordance with at least one embodiment of the invention. FIG. 7 displays the computer 700, one or more processor(s) 704 (including one or more computer processors), a communications fabric 702, a memory 706 including, a random-access memory (RAM) 716, and a cache 718, a persistent storage 708, a communications unit 712, I/O interfaces 714, a display 722, and external devices 720. It should be appreciated that FIG. 7 provides only an illustration of one embodiment and does not imply any limitations with regard to the environments in which different embodiments may be implemented. Many modifications to the depicted environment may be made.

As depicted, the computer 700 operates over the communications fabric 702, which provides communications between the computer processor(s) 704, memory 706, persistent storage 708, communications unit 712, and input/output (I/O) interface(s) 714. The communications fabric 702 may be implemented with an architecture suitable for passing data or control information between the processors 704 (e.g., microprocessors, communications processors, and network processors), the memory 706, the external devices 720, and any other hardware components within a system. For example, the communications fabric 702 may be implemented with one or more buses.

The memory 706 and persistent storage 708 are computer readable storage media. In the depicted embodiment, the memory 706 comprises a RAM 716 and a cache 718. In general, the memory 706 can include any suitable volatile or non-volatile computer readable storage media. Cache 718 is a fast memory that enhances the performance of processor(s) 704 by holding recently accessed data, and near recently accessed data, from RAM 716.

Program instructions for recipient validation program 112 may be stored in the persistent storage 708, or more generally, any computer readable storage media, for execution by one or more of the respective computer processors 704 via one or more memories of the memory 706. The persistent storage 708 may be a magnetic hard disk drive, a solid-state disk drive, a semiconductor storage device, read only memory (ROM), electronically erasable programmable read-only memory (EEPROM), flash memory, or any other computer readable storage media that is capable of storing program instruction or digital information.

The media used by persistent storage 708 may also be removable. For example, a removable hard drive may be used for persistent storage 708. Other examples include optical and magnetic disks, thumb drives, and smart cards that are inserted into a drive for transfer onto another computer readable storage medium that is also part of persistent storage 708.

The communications unit 712, in these examples, provides for communications with other data processing systems or devices. In these examples, the communications unit 712 includes one or more network interface cards. The communications unit 712 may provide communications through the use of either or both physical and wireless communications links. In the context of some embodiments of the present invention, the source of the various input data may be physically remote to the computer 700 such that the input data may be received, and the output similarly transmitted via the communications unit 712.

The I/O interface(s) 714 allows for input and output of data with other devices that may be connected to computer 700. For example, the I/O interface(s) 714 may provide a connection to external device(s) 720 such as a keyboard, a keypad, a touch screen, a microphone, a digital camera, and/or some other suitable input device. External device(s) 720 can also include portable computer readable storage media such as, for example, thumb drives, portable optical or magnetic disks, and memory cards. Software and data used to practice embodiments of the present invention, e.g., recipient validation program 112, can be stored on such portable computer readable storage media and can be loaded onto persistent storage 708 via the I/O interface(s) 714. I/O interface(s) 714 also connect to a display 722.

Display 722 provides a mechanism to display data to a user and may be, for example, a computer monitor. Display 722 can also function as a touchscreen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for validating proposed recipients based on message contents, the computer-implemented method comprising:
    counting, by one or more computer processors, a number of keywords in a message under construction that are not in a keyword database for each addressee of one or more addressees in the message under construction;
    responsive to the number of keywords in the message under construction that are not in the keyword database for the each addressee of the one or more addressees in the message under construction being above a first threshold, notifying, by the one or more computer processors, a user of a possible incorrect addressee;
    responsive to the user accepting the possible incorrect addressee in the message under construction, selecting, by the one or more computer processors, the one or more keywords in the message under construction for the possible incorrect addressee;
    adding, by the one or more computer processors, the one or more keywords in the message under construction to the keyword database for the possible incorrect addressee in the message under construction;
    responsive to finding one or more potential replacement addressees for the possible incorrect addressee in an address book of the user, creating, by the one or more computer processors, a list of the one or more potential replacement addressees, wherein the list contains each potential replacement addressee of the one or more potential replacement addressees having the number of keywords above a second threshold; and
    notifying, by the one or more computer processors, the user of the list of the one or more potential replacement addressees.

2. The computer-implemented method of claim 1, wherein notifying, by the one or more computer processors, the user of the one or more potential replacement addressees further comprises creating, by the one or more computer processors, a first pop-up window on a computer display of the user to display the list of the one or more potential replacement addressees.

3. The computer-implemented method of claim 1, further comprising:
    responsive to the number of keywords that are not in the keyword database for the each addressee of the one or more addressees in the message under construction being above the first threshold, selecting, by the one or more computer processors, the one or more keywords in the message under construction for the each addressee of the one or more addressees of the message under construction; and
    adding, by the one or more computer processors, the one or more keywords in the message under construction to the keyword database for the each addressee of the one or more addressees of the message under construction.

4. The computer-implemented method of claim 1, further comprising creating, by the one or more computer processors, a keyword database for the user, wherein the keyword database for the user stores one or more prior keywords for each addressee to whom the user has addressed a prior message.

5. The computer-implemented method of claim 1, wherein notifying the user of a possible incorrect addressee further comprises creating, by the one or more computer processors, a second pop-up window on a computer display of the user to inform the user of the possible incorrect addressee.

6. A computer program product for validating proposed recipients based on message contents, the computer program product comprising:
    one or more computer readable storage media and program instructions stored on the one or more computer readable storage media, the stored program instructions comprising:
    program instructions to count a number of keywords in a message under construction that are not in a keyword database for each addressee of one or more addressees in the message under construction;
    responsive to the number of keywords in the message under construction that are not in the keyword database for the each addressee of the one or more addressees in the message under construction being above a first threshold, program instructions to notify a user of a possible incorrect addressee;
    responsive to the user accepting the possible incorrect addressee in the message under construction, program instructions to select the one or more keywords in the message under construction for the possible incorrect addressee;
program instructions to add the one or more keywords in the message under construction to the keyword database for the possible incorrect addressee in the message under construction;
responsive to finding one or more potential replacement addressees for the possible incorrect addressee in an address book of the user, program instructions to create a list of the one or more potential replacement addressees, wherein the list contains each potential replacement addressee of the one or more potential replacement addressees having the number of keywords above a second threshold; and
program instructions to notify the user of the list of the one or more potential replacement addressees.

7. The computer program product of claim 6, wherein notify the user of the one or more potential replacement addressees further comprises program instructions to create a first pop-up window on a computer display of the user to display the list of the one or more potential replacement addressees.

8. The computer program product of claim 6, further comprising one or more program instructions, stored on the one or more computer readable storage media, to:
responsive to the number of keywords that are not in the keyword database for the each addressee of the one or more addressees in the message under construction being above the first threshold, select the one or more keywords in the message under construction for the each addressee of the one or more addressees of the message under construction; and
add the one or more keywords in the message under construction to the keyword database for the each addressee of the one or more addressees of the message under construction.

9. The computer program product of claim 6, further comprising program instructions to create a keyword database for the user, wherein the keyword database for the user stores one or more prior keywords for each addressee to whom the user has addressed a prior message.

10. The computer program product of claim 6, wherein notify the user of a possible incorrect addressee further comprises program instructions to create a second pop-up window on a computer display of the user to inform the user of the possible incorrect addressee.

11. A computer system for validating proposed recipients based on message contents, the computer system comprising:
one or more computer processors;
one or more computer readable storage media; and
program instructions stored on the one or more computer readable storage media for execution by at least one of the one or more computer processors, the stored program instructions comprising:
program instructions to count a number of keywords in a message under construction that are not in a keyword database for each addressee of one or more addressees in the message under construction;
responsive to the number of keywords in the message under construction that are not in the keyword database for the each addressee of the one or more addressees in the message under construction being above a first threshold, program instructions to notify a user of a possible incorrect addressee;
responsive to the user accepting the possible incorrect addressee in the message under construction, program instructions to select the one or more keywords in the message under construction for the possible incorrect addressee;
program instructions to add the one or more keywords in the message under construction to the keyword database for the possible incorrect addressee in the message under construction;
responsive to finding one or more potential replacement addressees for the possible incorrect addressee in an address book of the user, program instructions to create a list of the one or more potential replacement addressees, wherein the list contains each potential replacement addressee of the one or more potential replacement addressees having the number of keywords above a second threshold; and
program instructions to notify the user of the list of the one or more potential replacement addressees.

12. The computer system of claim 11, wherein notify the user of the one or more potential replacement addressees further comprises program instructions to create a first pop-up window on a computer display of the user to display the list of the one or more potential replacement addressees.

13. The computer system of claim 11, further comprising one or more program instructions, stored on the one or more computer readable storage media, to:
responsive to the number of keywords that are not in the keyword database for the each addressee of the one or more addressees in the message under construction being above the first threshold, select the one or more keywords in the message under construction for the each addressee of the one or more addressees of the message under construction; and
add the one or more keywords in the message under construction to the keyword database for the each addressee of the one or more addressees of the message under construction.

14. The computer system of claim 11, further comprising program instructions to create a keyword database for the user, wherein the keyword database for the user stores one or more prior keywords for each addressee to whom the user has addressed a prior message.

* * * * *